United States Patent [19]

Nikolov et al.

[11] 4,231,416
[45] Nov. 4, 1980

[54] APPARATUS FOR CASTING METALS AND OTHER MATERIALS UNDER PRESSURE

[75] Inventors: Ivan D. Nikolov; Iliya G. Chorbov; Ivan M. Peychev, all of Sofia, Bulgaria

[73] Assignee: NPO "Technologia Na Metalite", Sofia, Bulgaria

[21] Appl. No.: 5,780

[22] Filed: Jan. 23, 1979

[30] Foreign Application Priority Data

Jan. 25, 1978 [BG] Bulgaria ............................ 38480

[51] Int. Cl.³ .............................................. B22D 17/04
[52] U.S. Cl. .................................... 164/318; 164/113; 164/316
[58] Field of Search ............... 164/113, 309, 310, 316, 164/317, 318

[56] References Cited

U.S. PATENT DOCUMENTS

| | | | |
|---|---|---|---|
| 1,486,751 | 3/1924 | Hult | 164/303 X |
| 1,532,639 | 4/1925 | Sondley | 164/316 |
| 1,908,032 | 5/1933 | Lester | 164/309 X |
| 2,609,575 | 9/1952 | Morin | 164/318 |

FOREIGN PATENT DOCUMENTS 550847  1/1943  United Kingdom ................. 164/310

Primary Examiner—Robert D. Baldwin
Assistant Examiner—Gus T. Hampilos
Attorney, Agent, or Firm—Karl F. Ross

[57] ABSTRACT

An apparatus for the casting of metals and other materials under pressure in which the molten metal is introduced into a cylinder which is pressurized by a piston through an intervening pneumatic cushion to drive the molten metal into the mold. When the mold is filled with the metal, the piston increases the pressure further so as to maintain the pressure during solidification. Advantageously, the cylinder from which the molten metal is driven, is connected by a further cylinder to a hot chamber in which the melt is prepared, the connection between the two cylinders being at the bottom thereof and the entire assembly being mounted on a tiltable frame.

4 Claims, 6 Drawing Figures

APPARATUS FOR CASTING METALS AND OTHER MATERIALS UNDER PRESSURE

FIELD OF THE INVENTION

This invention relates to a method of and an apparatus for casting metals and other materials under pressure and, more particularly for casting metals in liquid or semiliquid state, especially nonferrous metals and alloys, plastics, silicate materials, etc. in permanent or expendable molds.

BACKGROUND OF THE INVENTION

A method of casting under pressure is known in which the pressure is produced by a piston immersed in the melt together with the cylinder, which is filled with melt through a hole opened and closed by the piston during its idle and working stroke, respectively. This method is known as pressure casting with a hot chamber.

It is a drawback of this method that the piston and the cylinder are subjected to the strong erosive and corrosive action of the melt; for this reason it is not possible to produce high pressures inside the mold, particularly at the end of the crystallization process of the casting, since between the piston and the cylinder there is always a large gap. Moreover, the use of this method is limited only to alloys of low aggressiveness with respect to iron, such as magnesium and, to a certain degree, zinc alloys.

In another known method the pressure acting over the melt is produced by pressurized gas. In this method the filling of the mold by the melt is effected as a result of a differential between the pressures in the furnace space and inside the casting mold.

A substantial drawback of this method is that, for increasing the pressure at the end of the process of filling the mold with melt, it is necessary to deliver fresh quantities of highly pressurized gas. This increase of the pressure is effected comparatively slowly and cannot be utilized for both shape formation and structure formation of the casting. Another drawback that the process uses large quantities of pressurized gas introduced from the outside, and this results in high material and energy losses. The large gas masses often worsen the conditions of mass exchange between the gas phase and the melt.

In pressurized-gas casting apparatus a vessel operating under internal pressure receives a furnace with the crucible containing the melt. By means of a runner tube, the casting mold is connected to the melt and when pressurized gas is introduced inside the pressure vessel, the melt fills the casting mold A drawback of such an apparatus is the large volume which must be filled with pressurized gas, and the impossibility of increasing sharply the pressure at the final stage of filling the casting mold with melt and of maintaining this pressure during the solidification of the casting. Another drawback is the large consumption of gas since, for the removal of the casting from the mold it is necessary to release the pressure and then, for the subsequent casting, to introduce again pressurized gas with material and energy losses.

OBJECT OF THE INVENTION

It is, therefore, a general object of the present invention to avoid the aforementioned drawbacks by providing a method for casting under pressure and an apparatus to effect this method, in which the rate of casting is controllable and there is a possibility for a rapid increase of the pressure at the end of the process of filling the casting mold with the melt and for maintaining the attained pressure during solidification, thus producing high-quality and pure castings.

SUMMARY OF THE INVENTION

This object is achieved by a method of casting metals and other materials under pressure, in which the material is transferred in molten or semimolten state into a heated chamber, and then a gas pressure is produced over the melt, under the action of which the melt enters the casting mold through a metal conduit. The gas pressure is produced by continuously pressurizing a gas volume of constant mass, during each casting process, by means of a piston. At the end of the process of filling the casting mold with melt, the gas pressure is rapidly increased and the attained pressure is maintained during the period of solidification of the casting.

The gist of the apparatus to effect the method of the invention lies in the following: over a rigid frame there is supported a movable frame which can be tilted by means of a hydraulic cylinder, and on the latter frame there is disposed a pressing unit. The force in the piston rod of the pressing unit is transferred to pneumatic piston, which is provided with an extender. The pneumatic piston moves inside a pneumatic cylinder, connected to a hot chamber, closed by a bottom. At the bottom there are disposed a large and a small chamber. In the upper portion of the small chamber there is a hole with a cover, provided with a closing mechanism.

The large and the small chambers are connected in their bottom end to a connecting pipe. By means of a replaceable pipe and an adapter, the large chamber is connected in its bottom end to a conduit for liquid metal. This conduit has a housing, which is connected by means of a pneumatic pipe to the body of the hot chamber.

The internal surfaces of the small and the large chamber are covered by a lining material. Inside the lining there are incorporated electric heaters, and thermal insulation is disposed between the walls of the small and the large chambers and the lining.

In the one end of the housing of the conduit for metal there is a nut with a seal, and at the side—terminals for electric supply of an electric heater incorporated in the lining. The housing of the liquid metal conduit is provided with another outlet for a thermocouple and a connection for the pneumatic pipe, and between the housing and the the lining there is provided thermal insulation.

The material of the lining withstands the agressive action of the melt and can be synthetic mica.

The advantages of the method of this invention are: the casting can be carried out smoothly at a controllable rate; the pressure over the melt is not produced by a piston or by introducing pressurized gas from the outside, but by a gas volume of constant mass, which is pressurized by a pneumatic piston with a extender in the apparatus itself. In the final period of filling the casting mold, the pressure can be rapidly increased and this pressure is maintained during the period of solidification of the casting. Another advantage is the small gas consumption.

The advantages of the apparatus by which the method is effected are: the pneumatic piston is not in contact with the melt and operates at a comparatively low, almost normal temperature, at which a good seal between the pnaumatic piston and the pneumatic cylinder is achieved, thereby permitting operation at high pressures. All surfaces of the hot chamber, the different pipes and the liquid-metal conduit with which the melt is in contact, are lined with a material which withstands the erosive action of the melt and its high temperature. This makes the casting of different melts, even aluminum alloys which are aggressive with respect to iron, possible. Inside the lining material of both chambers, forming the hot chamber and the conduit for metal, there are incorporated electric heaters. Around this layer of lining material and the housing, inside which the chambers are disposed, as well as the housing of the conduit for metal, there is provided thermal insulation which protects the loaded walls of the body and the housing from heating, and this permits the use of considerable pressures during the casting.

Another advantage of the apparatus lies in that, for the production of the pneumatic cylinder, the pneumatic piston, the body and the bottom of the hot chamber, as well as of the conduit for metal, there is no need for special materials and different thermo-chemical treatments with regard to increase their life.

BRIEF DESCRIPTION OF THE DRAWING

For a better understanding of the invention, reference should be made to the accompanying drawing in which there is illustrated and described a preferred embodiment of the invention. In the drawings.

SPECIFIC DESCRIPTION

Figure 1:
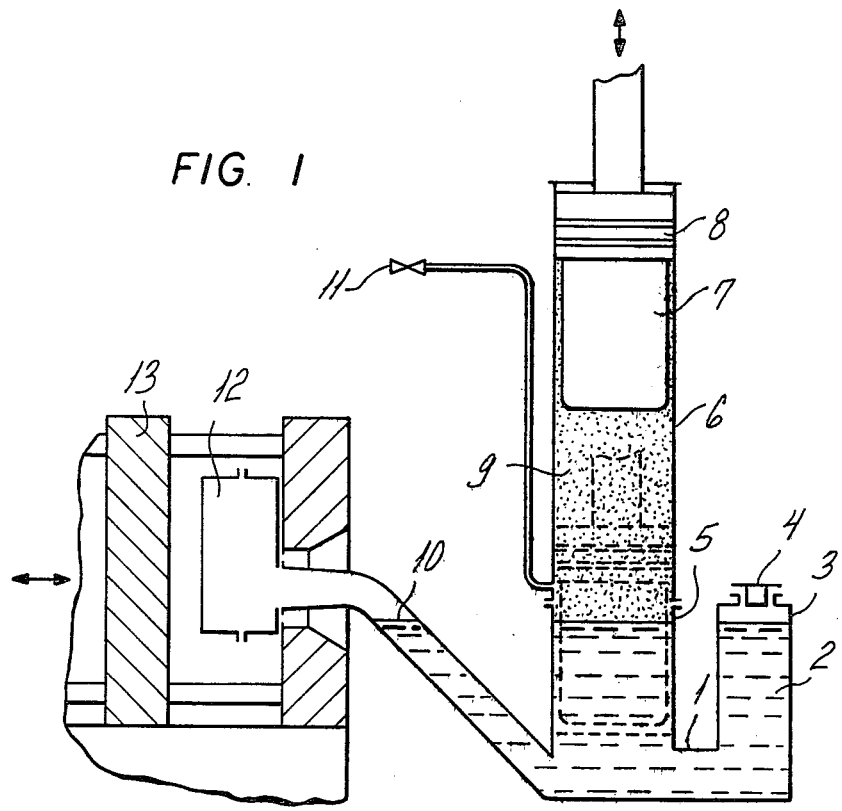
FIG. 1 is a diagrammatic illustration of the apparatus, when operating without counterpressure.
Figure 6:
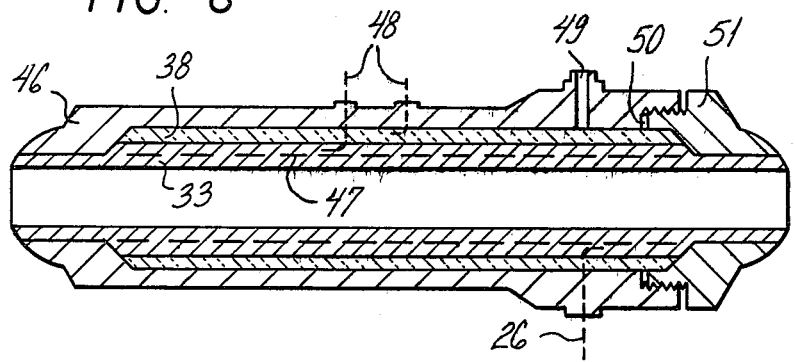
FIG. 6 is a longitudinal sectional view of the conduit for metal.
Figure 2:
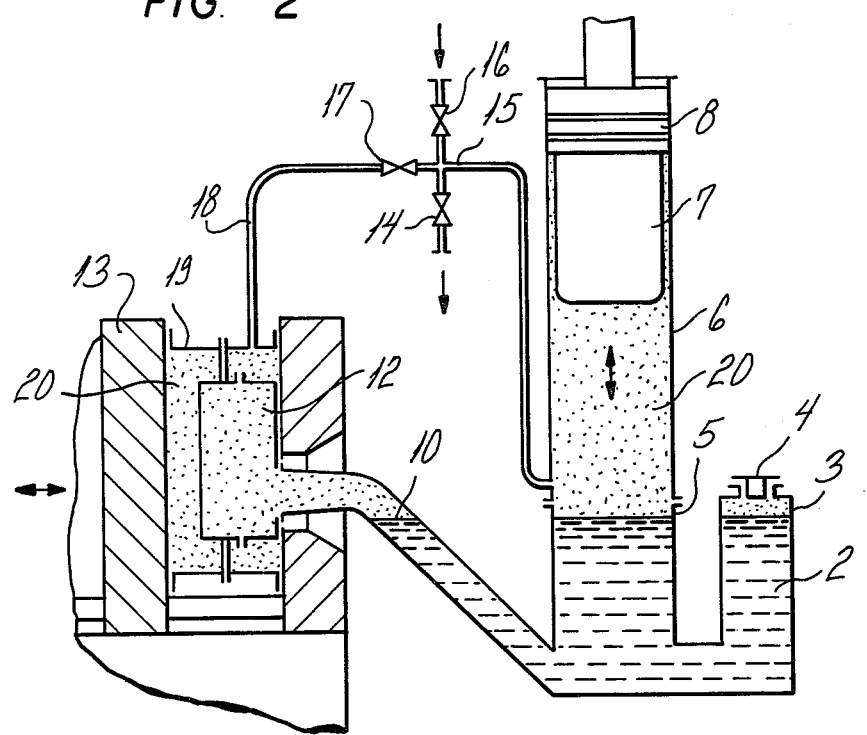
FIG. 2 is a diagrammatic illustration of the apparatus, adapted for counterpressure casting.
Figure 3:
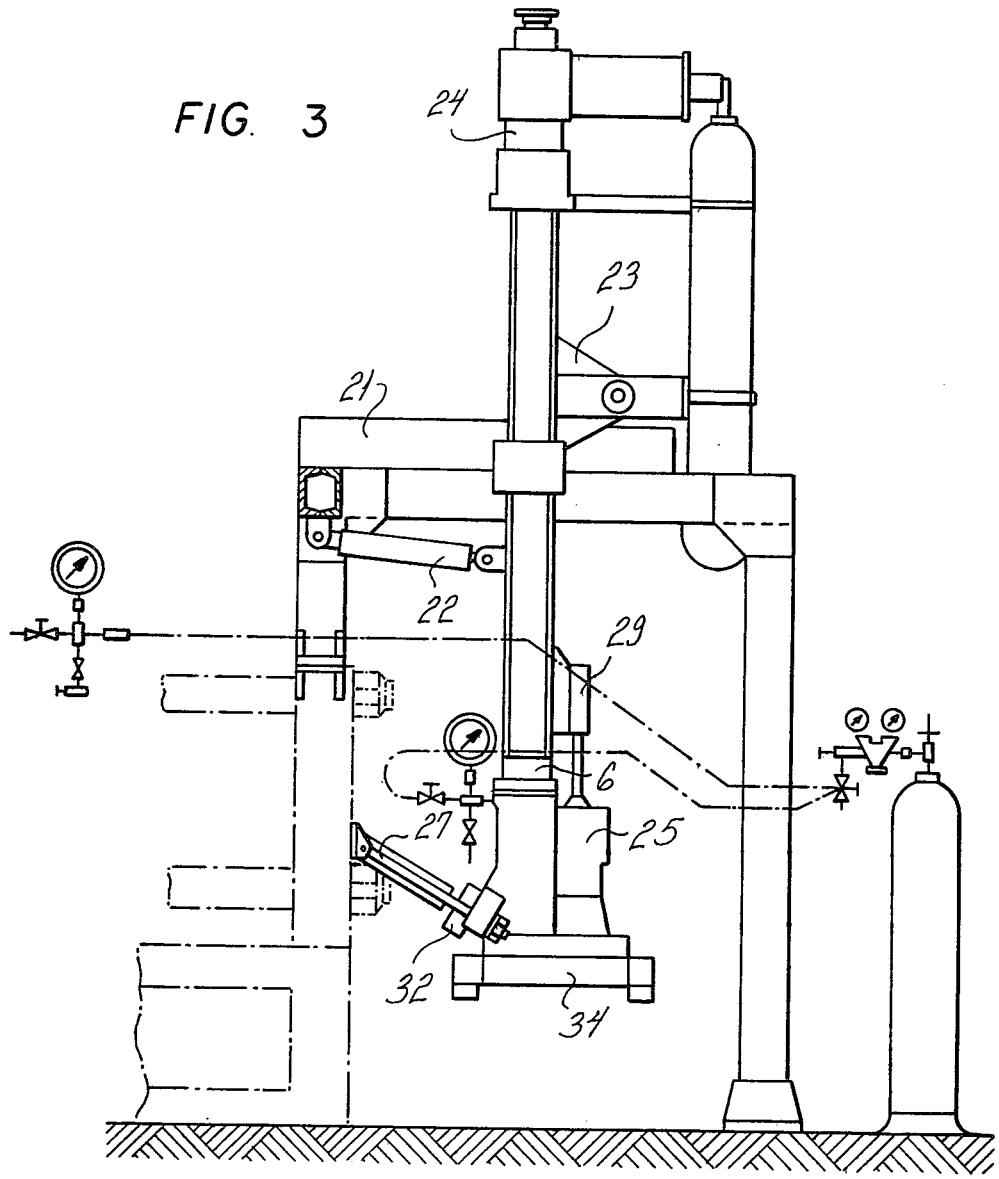
FIG. 3 is a front view of the apparatus in working position.
Figure 4:
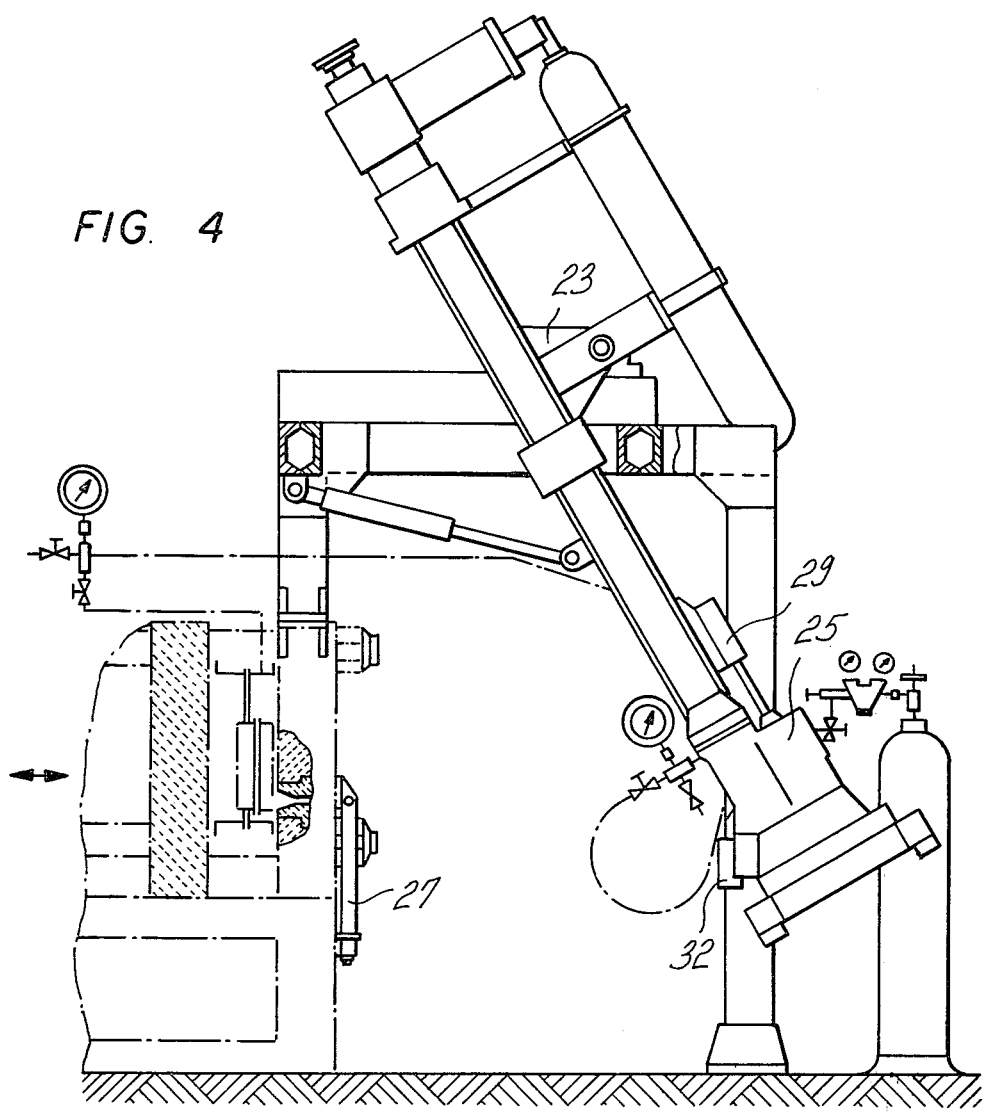
FIG. 4 is a front view of the apparatus in non-working position.

The apparatus comprises a casting mold 12 and a locking mechanism 13 of a pressure casting machine, to which there is fastened a rigid frame 21 (FIG. 3). To this rigid frame 21 there is supported a movable frame 23, driven by a hydraulic cylinder 22. To the movable frame 23 there are fastened a pressing unit 24 and a pneumatic piston 8 with an extension 7 (FIG. 1), which is disposed inside a pneumatic cylinder 6. The pneumatic cylinder 6 is connected to a hot chamber 25 (FIG. 3). The hot chamber 25 has a body 31 with a bottom 34, to which there are fastened a large chamber 5 and a small chamber 3 (see FIGS. 1 and 3). In the upper portion of the small chamber 3 there is provided a hole 28 with a cover 4, which is pressed by a closing mechanism 29 (FIG. 3). Both the small chamber 3 and the large chamber 5 are connected at their bottoms by a connecting pipe 1 or 43. By means of a replaceable pipe 44 and an adapter 32, the large chamber 5 is connected at its bottom end to a liquid-metal conduit 10, which has a housing 46 FIG. 6, connected by means of a pneumatic pipe 30 to the body of the hot chamber 25 (FIG. 3).

The small chamber 3 and the large chamber 5 are provided with a small cylinder 36 (FIG. 5) and a large cylinder 37, and are covered on the inside by a lining 33 into which there are incorporated electric heaters 39 and 40. Between the cylinders 36 and 37 and the lining 33 there is provided a thermal insulation 38. Inside the small chamber 3 there is disposed a grid 35.

Figure 5:
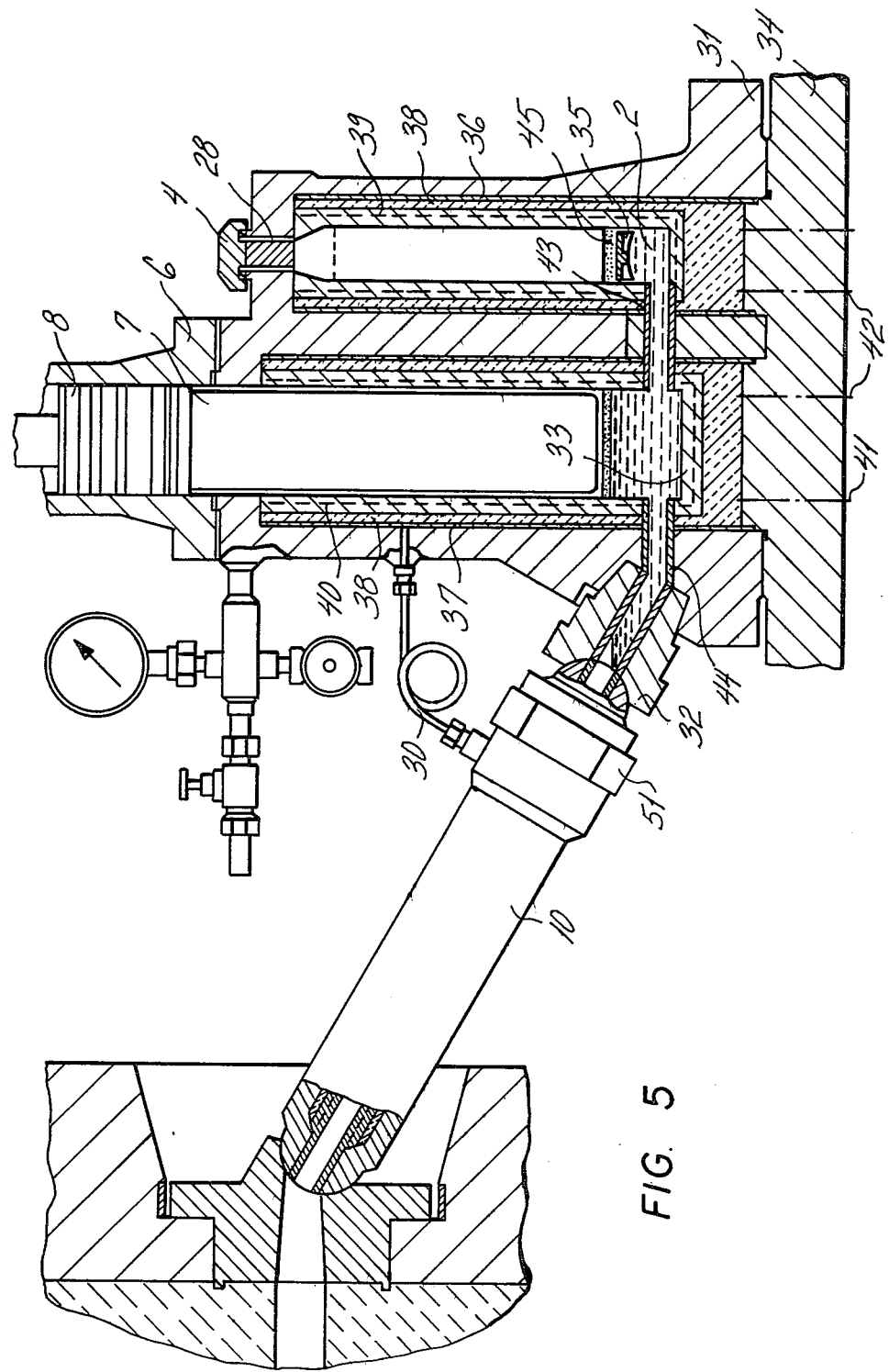
FIG. 5 is a longitudinal section of the hot chamber with the pneumatic cylinder and the pneumatic pipe, connecting the body of the hot chamber to the liquid-metal conduit.

At the one end of the housing 46 of the liquid-metal conduit 10 there is a nut 51 with a seal 50, and on the side—outlets for electric supply 26 of the electric heater 47, incorporated into the lining 33 (FIG. 5). Housing 46 has an additional outlet for the thermocouple 48 and a connection 49 for the pneumatic pipe 30. Between housing 46 and the lining 33 with the incorporated an electric heater 47 there is provided a thermal insulation 38. The conduit for metal 10 is pressed towards the adapter 32 and the casting mould 12 by means of hinged bolts 27. At the bottom 34 there are outlets for thermocouples 42.

The apparatus of the present invention operates as follows: In working position, when the internal walls of the hot chamber 25 and the metal conduit 10 are heated to a corresponding temperature, and the metal conduit is pressed by the hinged bolts 27, in the upper position of the pneumatic piston 8 and opened cover 4, through hole 28 there is poured a preset quantity of flux 45. Then a preset quantity of melt 2 is poured, which is refined by means of grid 35, through the flux layer 45. Valve 11 and cover 4 are closed, and by actuating the pressing unit 24, the pneumatic piston 8 is moved downward, pressurizing a gas volume 9. At the end of the filling of the casting mold 12 with the melt under the action of the pressing unit 24 the pressure is rapidly increased and maintained in this position until the end of the solidification process. At this stage the pneumatic piston 8 is in an end, bottom, position. Ater the end of solidification, the pneumatic piston 8 is returned in initial position, valve 11 is opened and gas is fed to the pneumatic cylinder of which is volume equal to the volume of the casting cover 4 is opened, and after the removal of the casting from the mold 12, the latter is closed, and a new casting cycle as already described is started, omitting only the pouring of flux 45. Part of the flux enters the large chamber 5 and the metal conduit 10 during the first casting cycle. The flux layer, which remains in the large chamber 5 over the melt, protects the latter from contact with the gas phase. At first several trial castings are made with the purpose to remove the flux, which has reached the metal conduit.

After the termination of operation, the hinged bolts 27 are tensioned, the apparatus is set in non-working position, and by means of hydraulic cylinder 22 the movable frame 23 is tilted, the electric heating of the metal conduit 10 is stopped and the latter is removed.

When tilting the movable frame 23 to end position, the remaining part of the melt 2 and the flux 45 are poured through the adapter 32 and then the electric heating of the hot chamber 25 is stopped.

The apparatus can also operate by the counterpressure casting method. In this case, after pouring a preset quantity of melt 2 and closing the cover 4, by the inlet valve 16 there is introduced simultaneously through the gas conduit 15 and the gas conduit of housing 18 pressurized gas 20 to the pneumatic cylinder 6 and the hood 19, respectively. Then inlet valve 16 and connecting valve 17 are closed and the pneumatic piston 8 is actuated. After the casting has solidified, outlet valve 14 is opened, the pressurized gas is released and all remaining operations are performed as aforedescribed.

What we claim is:

1. An apparatus for casting a molten material under pressure, comprising:
   a support structure receiving a casting mold;
   a movable frame pivotally connected to said support structure for tilting movement toward and away from said mold;
   a melt-displacing assembly mounted on said frame, said assembling comprising hot chamber means including:
   a large chamber, formed in said hot chamber means, having generally upright side walls in a position of said assembly proximal to said mold;
   a relatively small chamber, formed in said hot chamber means adjacent said large chamber, having upright side walls in a position of said assembly proximal to said mold; said small chamber being in fluid communication with said large chamber by means of a melt communication passage formed in said hot chamber means at a lower end of each chamber;
   said small chamber having an opening at an upper end thereof;
   a displaceable cover for sealing said opening of said small chamber of said hot chamber means;
   pressurizable means associated with said frame for displacing said cover to seal the small chamber opening of said hot chamber means;
   means forming a cylinder communicating with said large chamber of said hot chamber means;
   gas supply means, associated with the large chamber of said hot chamber means, for supplying gas to said large chamber;
   a piston being reciprocatable in said cylinder to compress said gas and drive molten metal from said large chamber;
   a pressing unit mounted on said frame and associated with said piston for displacing said piston in said cylinder; and
   a metal-conducting conduit associated with said hot chamber means for connecting said large chamber with said mold in the position of said assembly proximal to said mold.

2. The apparatus defined in claim 1, further comprising a pneumatic tube connecting the interior of said conduit to said hot chamber, said small chamber and said large chamber being provided as a small cylinder and a large cylinder respectively covered internally by linings, said assembly further comprising electric heaters in said lining and a grid positioned within said small chamber of said hot chamber.

3. The apparatus defined in claim 1 or claim 2 wherein said metal-conducting conduit comprises:
   a housing provided with an internal lining and a layer of thermal insulation between said housing and said lining;
   an electric heating means formed in said lining,
   terminals, for connecting said electric heater to a source of electricity, provided on the exterior of said housing;
   a thermocouple receivable in said lining; and
   a nut, provided with a seal, adapted to secure said insulation and lining to said housing.

4. The apparatus defined in claim 3 wherein said lining is composed of synthetic mica.

* * * * *